United States Patent
Fuqua et al.

(10) Patent No.: US 9,581,024 B2
(45) Date of Patent: Feb. 28, 2017

(54) AIR HANDLING CONSTRUCTIONS FOR OPPOSED-PISTON ENGINES

(71) Applicant: Achates Power, Inc., San Diego, CA (US)

(72) Inventors: Kevin B. Fuqua, San Diego, CA (US); John J. Koszewnik, San Diego, CA (US); Suramya D. Naik, San Diego, CA (US); Fabien G. Redon, San Diego, CA (US); Gerhard Regner, San Diego, CA (US); Rodrigo Zermeño-Benitez, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 377 days.

(21) Appl. No.: 14/284,058

(22) Filed: May 21, 2014

(65) Prior Publication Data

US 2015/0337727 A1    Nov. 26, 2015

(51) Int. Cl.

| | |
|---|---|
| *F02B 33/44* | (2006.01) |
| *F02D 13/06* | (2006.01) |
| *F01B 7/14* | (2006.01) |
| *F02B 75/20* | (2006.01) |
| *F01N 13/10* | (2010.01) |
| *F02M 35/10* | (2006.01) |

(Continued)

(52) U.S. Cl.
CPC .............. *F01B 7/14* (2013.01); *F01N 13/105* (2013.01); *F02B 37/04* (2013.01); *F02B 75/20* (2013.01);
(Continued)

(58) Field of Classification Search
CPC ........ F02B 75/28; F02B 75/282; F02B 75/20; F02B 37/013; F02B 33/40; F02B 33/446; F01B 7/14; F02G 2244/12
(Continued)

(56) References Cited

U.S. PATENT DOCUMENTS

| | | |
|---|---|---|
| 1,517,634 A | 9/1920 | Junkers |
| 2,295,879 A | 9/1942 | Tucker ............................ 123/51 |

(Continued)

FOREIGN PATENT DOCUMENTS

| | | |
|---|---|---|
| GB | 364395 A | 1/1932 |
| WO | WO-2013/093501 A1 | 6/2013 |
| WO | WO 2013/126347 A1 | 8/2013 |

OTHER PUBLICATIONS

International Search Report and Written Opinion for PCT application PCT/US2015/029033, mailed Jul. 20, 2015.
(Continued)

*Primary Examiner* — Nicholas J Weiss
*Assistant Examiner* — Ngoc T Nguyen
(74) *Attorney, Agent, or Firm* — Terrance A. Meador

(57) ABSTRACT

An opposed-piston engine has a cylinder block with a plurality of cylinders arranged inline, with each cylinder including an intake port longitudinally separated from an exhaust port. The engine is equipped with an air handling system that includes intake and exhaust chambers inside the cylinder block. All of the cylinder intake ports are contained in the intake chamber to receive charge air therein. The intake chamber includes elongated air inlets opening through opposing sides of the cylinder block. The exhaust chamber includes at least one exhaust outlet opening through a side of the cylinder block; all of the cylinder exhaust ports are contained in the exhaust chamber to discharge exhaust thereinto.

25 Claims, 13 Drawing Sheets

(51) Int. Cl.
*F02B 75/28* (2006.01)
*F02B 37/04* (2006.01)
*F02B 29/04* (2006.01)
*F02M 35/112* (2006.01)

(52) U.S. Cl.
CPC ....... *F02B 75/282* (2013.01); *F02M 35/1015* (2013.01); *F02M 35/10157* (2013.01); *F02M 35/10222* (2013.01); *F02B 29/04* (2013.01); *F02B 29/0406* (2013.01); *F02M 26/08* (2016.02); *F02M 35/112* (2013.01); *Y02T 10/144* (2013.01)

(58) Field of Classification Search
USPC ............ 123/198 F, 46 R, 562, 559.1; 60/612
See application file for complete search history.

(56) References Cited

U.S. PATENT DOCUMENTS

| | | | |
|---|---|---|---|
| 3,005,306 A * | 10/1961 | Bush | F02B 71/04 417/340 |
| 3,023,743 A | 3/1962 | Schauer, Jr. | |
| 4,071,000 A * | 1/1978 | Herbert | F01B 7/14 123/51 BA |
| 4,269,158 A | 5/1981 | Berti | |
| 4,714,056 A | 12/1987 | Tottori et al. | 123/65 |
| 5,515,817 A | 5/1996 | Nurmi et al. | |
| 6,026,775 A | 2/2000 | Yamane | |
| 6,227,179 B1 | 5/2001 | Eirmann et al. | |
| 6,554,585 B1 * | 4/2003 | Maracchi | F02B 71/04 123/46 R |
| 6,619,275 B2 | 9/2003 | Wilk | |
| 6,976,479 B1 | 12/2005 | Gottemoller et al. | |
| 8,286,615 B2 | 10/2012 | Dehnen et al. | |
| 8,549,854 B2 | 10/2013 | Dion et al. | 123/46 |
| 8,671,919 B2 | 3/2014 | Nakasugi et al. | |

OTHER PUBLICATIONS

International Search Report and Written Opinion for PCT application PCT/US2015/029038, mailed Jul. 20, 2015.
Junkers Flugzeug-und Motorenwerke A.G., Junkers Diesel Flugmotoren Junno 205C, D u. 207B, Dessau, Oct. 1942, pp. 22-24.

* cited by examiner

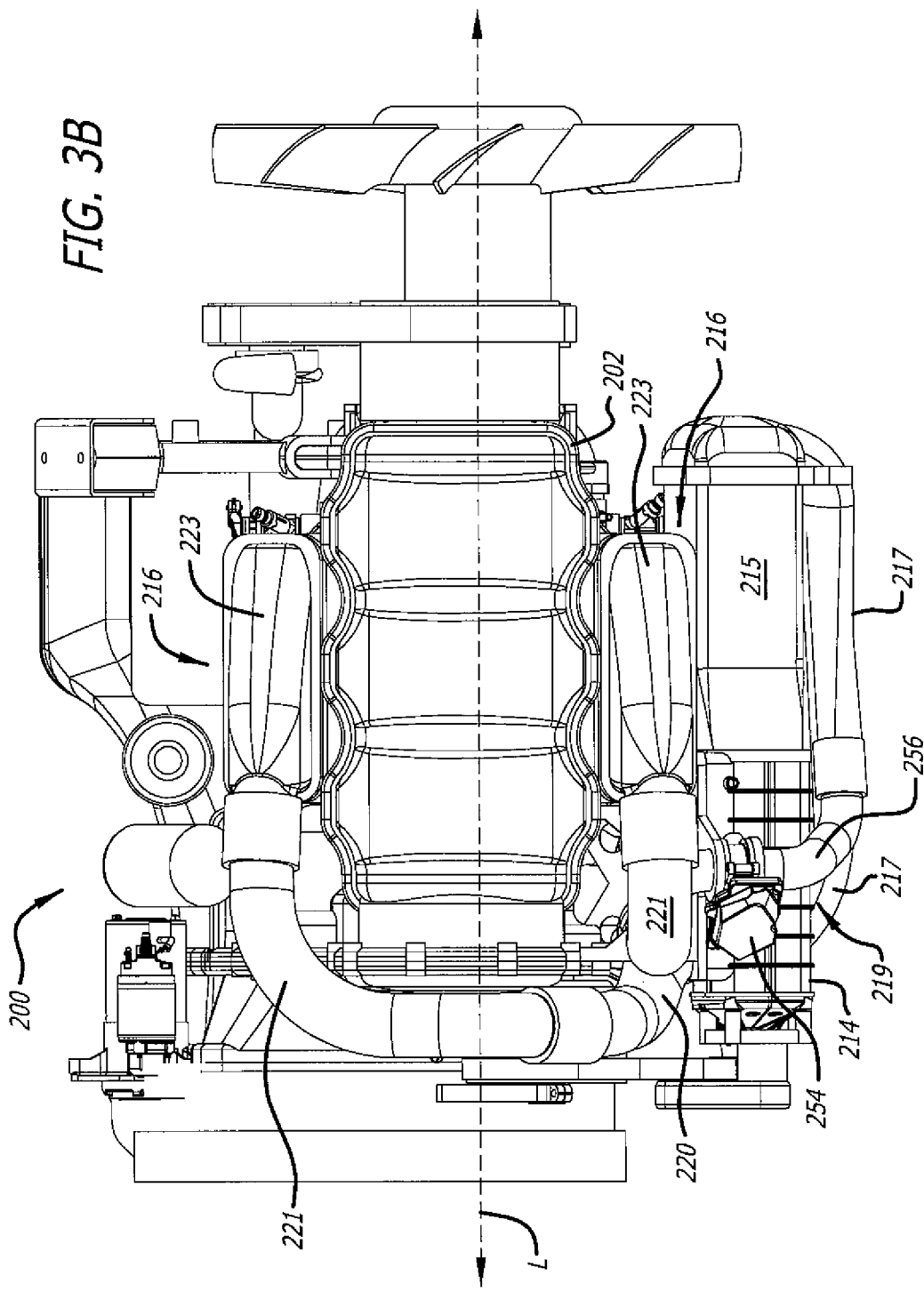

AIR HANDLING CONSTRUCTIONS FOR OPPOSED-PISTON ENGINES

RELATED APPLICATIONS

This application contains subject matter related to that of commonly-owned U.S. patent applications Ser. Nos. 13/782,802 and 14/039,856. This application further contains subject matter related to that of concurrently-filed, commonly-owned U.S. patent application Ser. No. 14/284 134, "Open Intake and Exhaust Chamber Constructions for an Air Handling System of an Opposed-Piston Engine".

BACKGROUND

The field relates to two-stroke cycle, opposed-piston engines. Particularly, the field concerns an air handling system that delivers air to, and transports exhaust from, the inline cylinders of an opposed-piston engine.

A two-stroke cycle engine is an internal combustion engine that completes a cycle of operation with a single complete rotation of a crankshaft and two strokes of a piston connected to the crankshaft. The strokes are typically denoted as compression and power strokes. One example of a two-stroke cycle engine is an opposed-piston engine in which two pistons are disposed in the bore of a cylinder for reciprocating movement in opposing directions along the central axis of the cylinder. Each piston moves between a bottom center (BC) location where it is nearest one end of the cylinder and a top center (TC) location where it is furthest from the one end. The cylinder has ports formed in the cylinder sidewall near respective BC piston locations. Each of the opposed pistons controls one of the ports, opening the port as it moves to its BC location, and closing the port as it moves from BC toward its TC location. One of the ports serves to admit charge air into the bore, the other provides passage for the products of combustion out of the bore; these are respectively termed "intake" and "exhaust" ports (in some descriptions, intake ports are referred to as "air" ports or "scavange" ports). In a uniflow-scavenged opposed-piston engine, pressurized charge air enters a cylinder through its intake port as exhaust gas flows out of its exhaust port, thus gas flows through the cylinder in a single direction ("uniflow")—from intake port to exhaust port.

Charge air and exhaust products flow through the cylinder via an air handling system (also called a "gas exchange" system). Fuel is delivered by injection from a fuel delivery system. As the engine cycles, a control mechanization governs combustion by operating the air handling and fuel delivery systems in response to engine operating conditions. The air handling system may be equipped with an exhaust gas recirculation ("EGR") system to reduce production of undesirable compounds during combustion.

In an opposed-piston engine, the air handling system moves fresh air into and transports combustion gases (exhaust) out of the engine, which requires pumping work. The pumping work may be done by a gas-turbine driven pump, such as a compressor, and/or by a mechanically-driven pump, such as a supercharger. In some instances, the compressor unit of a turbocharger may feed the inlet of a downstream supercharger in a two-stage pumping configuration. The pumping arrangement (single stage, two-stage, or otherwise) drives the scavenging process, which is critical to ensuring effective combustion, increasing the engine's indicated thermal efficiency, and extending the lives of engine components such as pistons, rings, and cylinders. The pumping work also drives an exhaust gas recirculation system.

FIG. 1 illustrates a turbocharged, two-stroke cycle, opposed-piston engine 10 with uniflow scavenging. The engine 10 has at least one ported cylinder 50. For example, the engine may have one ported cylinder, two ported cylinders, or three or more ported cylinders. Each ported cylinder 50 has a bore 52 and longitudinally-spaced intake and exhaust ports 54 and 56 formed or machined near respective ends of a cylinder wall. Each of the intake and exhaust ports includes one or more circumferential arrays of openings or perforations. In some descriptions, each opening is referred to as a "port"; however, the construction of one or more circumferential arrays of such "ports" is no different than the port constructions shown in FIG. 1. Pistons 60 and 62 are slidably disposed in the bore 52 with their end surfaces 61 and 63 in opposition. The piston 60 controls the intake port 54, and the piston 62 controls the exhaust port 56. In the example shown, the engine 10 further includes at least one crankshaft; preferably, the engine includes two crankshafts 71 and 72. The intake pistons 60 of the engine are coupled to the crankshaft 71, and the exhaust pistons 62 to the crankshaft 72.

As the pistons 60 and 62 near their TC locations, a combustion chamber is defined in the bore 52 between the end surfaces 61 and 63 of the pistons. Combustion timing is frequently referenced to the point in the compression cycle where minimum combustion chamber volume occurs because the pistons end surfaces are nearest each other; this point is referred to as "minimum volume." Fuel is injected directly into cylinder space located between the end surfaces 61 and 63. In some instances injection occurs at or near minimum volume; in other instances, injection may occur before minimum volume. Fuel is injected through one or more fuel injector nozzles positioned in respective openings through the sidewall of the cylinder 50. Two such nozzles 70 are shown. The fuel mixes with charge air admitted into the bore 52 through the intake port 54. As the air-fuel mixture is compressed between the end surfaces 61 and 63, the compressed air reaches a temperature and a pressure that cause the fuel to ignite. Combustion follows.

With further reference to FIG. 1, the engine 10 includes an air handling system 80 that manages the transport of charge air to, and exhaust gas from, the engine 10. A representative air handling system construction includes a charge air subsystem and an exhaust subsystem. In the air handling system 80, a charge air source receives intake air and processes it into pressurized air (hereinafter "charge air"). The charge air subsystem transports the charge air to the intake ports of the engine. The exhaust subsystem transports exhaust products from exhaust ports of the engine for delivery to other exhaust components.

The air handling system 80 may include a turbocharger 120 with a turbine 121 and a compressor 122 that rotate on a common shaft 123. The turbine 121 is in fluid communication with the exhaust subsystem and the compressor 122 is in fluid communication with the charge air subsystem. The turbocharger 120 extracts energy from exhaust gas that exits the exhaust ports 56 and flows into an exhaust channel 124 directly from the exhaust ports 56, or from an exhaust manifold assembly 125 that collects exhaust gasses output through the exhaust ports 56. In this regard, the turbine 121 is rotated by exhaust gas passing through it to an exhaust outlet channel 128. This rotates the compressor 122, causing it to generate charge air by compressing fresh air. The charge air subsystem may include a supercharger 110 and an intake manifold 130. The charge air subsystem may further include at least one charge air cooler (hereinafter, "cooler") to receive and cool the charge air before delivery to the intake port or ports of the engine. The charge air output by the compressor 122 flows through a charge air channel 126 to a cooler 127, whence it is pumped by the supercharger 110 to the intake ports. Charge air compressed by the supercharger 110 is output to an intake manifold 130. The intake ports 54 receive charge air pumped by the supercharger 110, through the intake manifold 130. A second cooler 129 may be provided between the outlet of the supercharger 110 and the inlet of the intake manifold 130.

In some aspects, the air handling system 80 may be constructed to reduce undesirable emissions produced by combustion by recirculating a portion of the exhaust gas produced by combustion through the ported cylinders of the engine. The recirculated exhaust gas is mixed with charge air to lower peak combustion temperatures, which reduces production of the undesirable emissions. This process is referred to as exhaust gas recirculation ("EGR"). The EGR construction shown obtains a portion of the exhaust gasses flowing from the port 56 during scavenging and transports them via an EGR channel 131 external to the cylinders into the incoming stream of inlet air in the charge air subsystem. The recirculated exhaust gas flows through the EGR channel 131 under the control of a valve 138 (referred to as the "EGR valve").

FIG. 2 shows the air handling system 80 of FIG. 1 in schematic detail. In this regard, the charge air subsystem provides intake air to the compressor 122. As the compressor 122 rotates, compressed air flows from the compressor's outlet, through the charge air channel 126, and into the supercharger 110. Charge air pumped by the supercharger 110 flows through the cooler 129 into the intake manifold 130. Pressurized charge air is delivered from the intake manifold 130 to the intake ports of the cylinders 50, which are supported in a cylinder block 160. In some aspects, the engine may include a recirculation channel 112 that couples the outlet of the supercharger 110 to its inlet. Provision of a valve 139 in the recirculation channel 112 allows the charge air flow to the cylinders to be varied by modulation of charge air pressure downstream of the supercharger outlet.

Exhaust gasses from the exhaust ports of the cylinders 50 flow from the exhaust manifold 125 into the turbine 121, and from the turbine into the exhaust outlet channel 128. In some instances, one or more after-treatment devices (AT) 162 are provided in the exhaust outlet channel 128. Exhaust is recirculated through the EGR channel 131, under control of the EGR valve 138. The EGR channel 131 is in fluid communication with the charge air subsystem via an EGR mixer (not shown).

Opposed-piston engines have included various constructions designed to transport engine gasses (charge air, exhaust) into and out of the cylinders. For example, U.S. Pat. No. 1,517,634 describes an early opposed-piston aircraft engine that made use of a multi-pipe exhaust manifold having a pipe in communication with the exhaust area of each cylinder that merged with the pipes of the other cylinders into one exhaust pipe. The manifold was mounted to one side of the engine.

Later, in the 1930s, the Jumo 205 family of opposed-piston aircraft engines established a basic air handling architecture for dual-crankshaft, inline, opposed-piston engines. Each engine was equipped with multi-pipe exhaust manifolds that bolted to opposite sides of an inline cylinder block with six cylinders so as to place a respective pair of opposing pipes in communication with the annular exhaust area of each cylinder. The outlet pipe of each exhaust manifold was connected to a respective one of two entries to a turbine. A two-stage pressure charging system provided pressurized charge air. The pressurized charge air output by the second stage flowed through an intercooler that straddled the bottom of the engine. The charge air then flowed out from the intercooler through pipes to intake conduits which ran along the sides of the engine like the exhaust manifolds. The constructions of the exhaust and intake systems imposed considerable burdens that resulted in increased engine volume, weight and cost, and reduced performance.

The prior art exhaust manifolds extracted a penalty in increased engine size and weight. Each individual pipe required structural support in order to closely couple the pipe opening with the annular exhaust space of a cylinder. Typically, the support was in the form of a flange at the end of each pipe with an area sufficient to receive threaded fasteners for sealably fastening the flange to a corresponding area on a side of the cylinder block. The flanges of each manifold were arranged row-wise in order to match the inline arrangement of the cylinders. The flange width restricted cylinder-to-cylinder spacing, which required the engine to be comparatively heavy and large.

The prior art intake construction for the Jumo 205 required an intercooler mounted to the engine that was coupled to two intake conduits, one on each side of the engine, via pipes and fittings that introduced length, bends, and constrictions into the charge air pathway between the cooler and the conduits. The variations in direction and flow resistance resulted in parasitic eddies and oscillations that produced sharp variations in charge air pressure from cylinder to cylinder and that changed in response to changing engine conditions. Surges, spikes, and other sharp inconsistencies and asymmetries in the pressure of charge air delivered to the intake ports can produce inconsistent combustion and incomplete scavenging, making the engine less efficient, dirtier-running, and more difficult to control over the range of engine operating conditions that the engine was designed for.

The Jumo intake construction also included a manifold structure formed inside the cylinder block by subdividing space into individual compartments for the inlet areas of the cylinders. Each compartment opened through opposing sides of the cylinder block to receive charge air from the intake conduits. Such a manifold structure may produce charge air pressure differentials between inlet ports, which can cause variations in combustion and scavenging as engine operating conditions change.

SUMMARY

It is desirable to minimize the size, weight, and cost of an opposed-piston engine with multiple cylinders arranged in an inline configuration. This is achieved by provision of a single exhaust chamber inside the cylinder block that contains all of the cylinder exhaust ports, thereby eliminating the need for a flanged, multi-pipe manifold construction. Instead of collecting and transporting exhaust gas discharged from individual exhaust ports with dedicated pairs of pipes, exhaust gas discharged by all of the exhaust ports is collected in a single exhaust chamber within the cylinder block and transported therefrom by a single pipe. The discharged exhaust gas exits the chamber through at least one exhaust outlet that opens through the cylinder block. Advantageously, only a single pipe is required to transport exhaust gas from the exhaust outlet to the exhaust subsystem, thereby eliminating the flange-to-flange spacing between separate pipes of the prior art exhaust manifolds. As a result, the weight of the multi-pipe manifolds is eliminated, inter-cylinder spacing can be reduced, and the engine can be made more compact.

In order to ensure consistent, reliable combustion and scavenging, it is desirable and useful to eliminate spikes, surges, oscillations, and other asymmetries in the flow of charge air provided to the intake ports of an opposed-piston engine. Charge air pressure variations are dampened in an opposed-piston engine by provision of charge air coolers closely coupled to an open, undivided intake chamber inside the cylinder block that contains all of the cylinder intake ports. The intake chamber includes opposing elongate air inlets that open through opposite sides of the cylinder block. A respective charge air cooler is positioned near each elongate air inlet, and has an elongate outlet opening that is aligned and closely coupled with the elongate air inlet. In some aspects, the outlet opening of the charge air cooler is substantially the same width as the air inlet. In other aspects, the width of the outlet opening of the charge air cooler is no greater than the width of the air inlet. The charge air coolers dampen spikes and surges in charge air pressure and reduce or eliminate asymmetries in air flow. Elongation of the charge air cooler outlet openings preserves air flow symmetry and reduces the velocity of charge air admitted to the intake chamber. As a result, combustion inconsistencies caused by parasitic fluid flow effects in the charge air subsystem are reduced or eliminated.

BRIEF DESCRIPTION OF THE DRAWINGS

FIG. 3B is a plan view of the top of the engine of FIG. 3A.

SPECIFICATION

This specification concerns a two-stroke cycle, dual crankshaft, opposed-piston engine having a cylinder block with a plurality of cylinders aligned in one row such that a single plane contains the longitudinal axes of all the engine's cylinders. The row-wise alignment of the cylinders is referred to as an "inline" configuration in keeping with standard nomenclature of the engine arts. Furthermore, the inline arrangement can be "straight", wherein the plane containing the longitudinal axes is essentially vertical, or "slant", wherein the plane containing the longitudinal axes is slanted. Thus, while the following description is limited to an inline configuration, it is applicable to straight and slant variations. It is also possible to position the engine in such a manner as to dispose the plane containing the longitudinal axes essentially horizontally, in which case the inline arrangement would be "horizontal".

Figure 1:
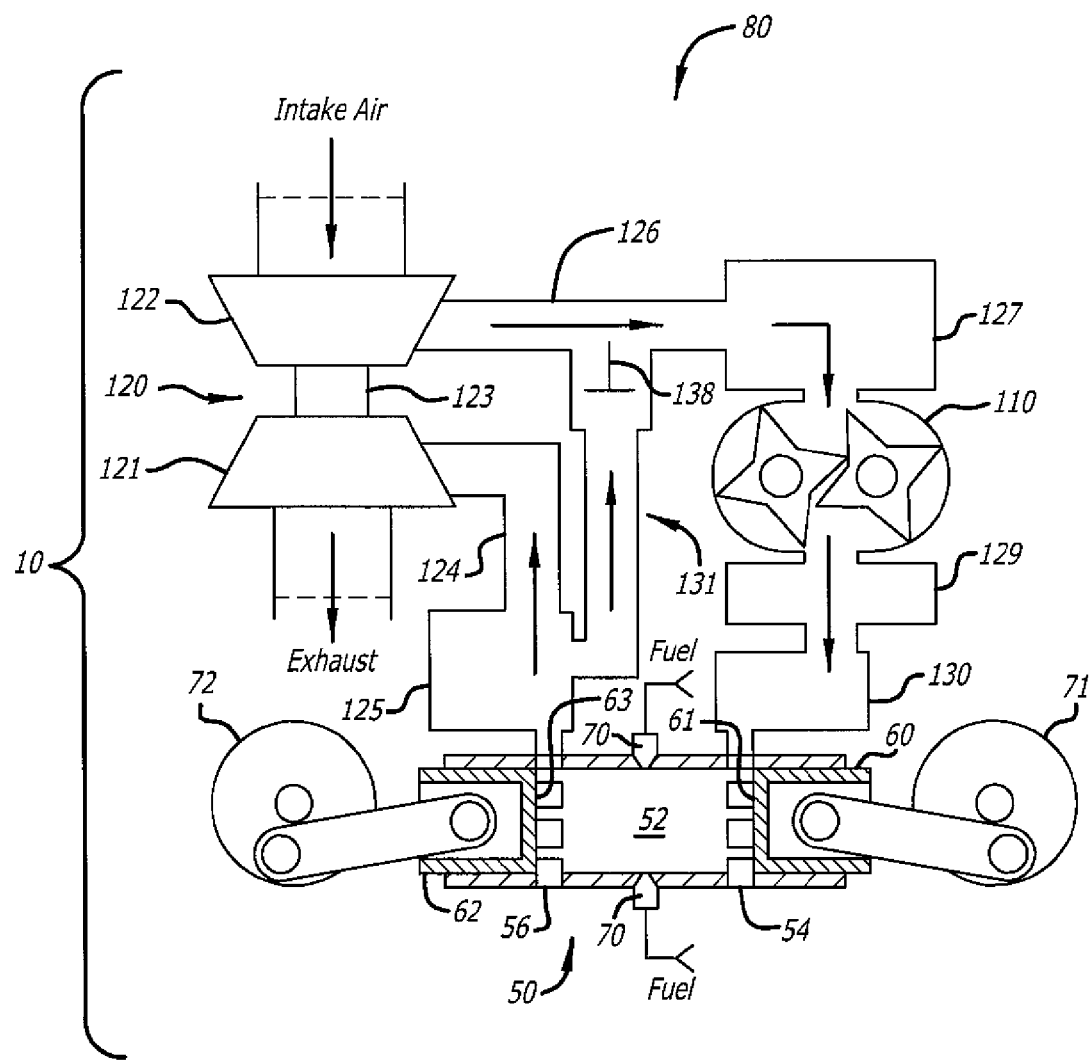
FIG. 1 is a schematic diagram of a prior art two-stroke cycle, opposed-piston engine with uniflow scavenging, and is appropriately labeled "Prior Art.
Figure 2:
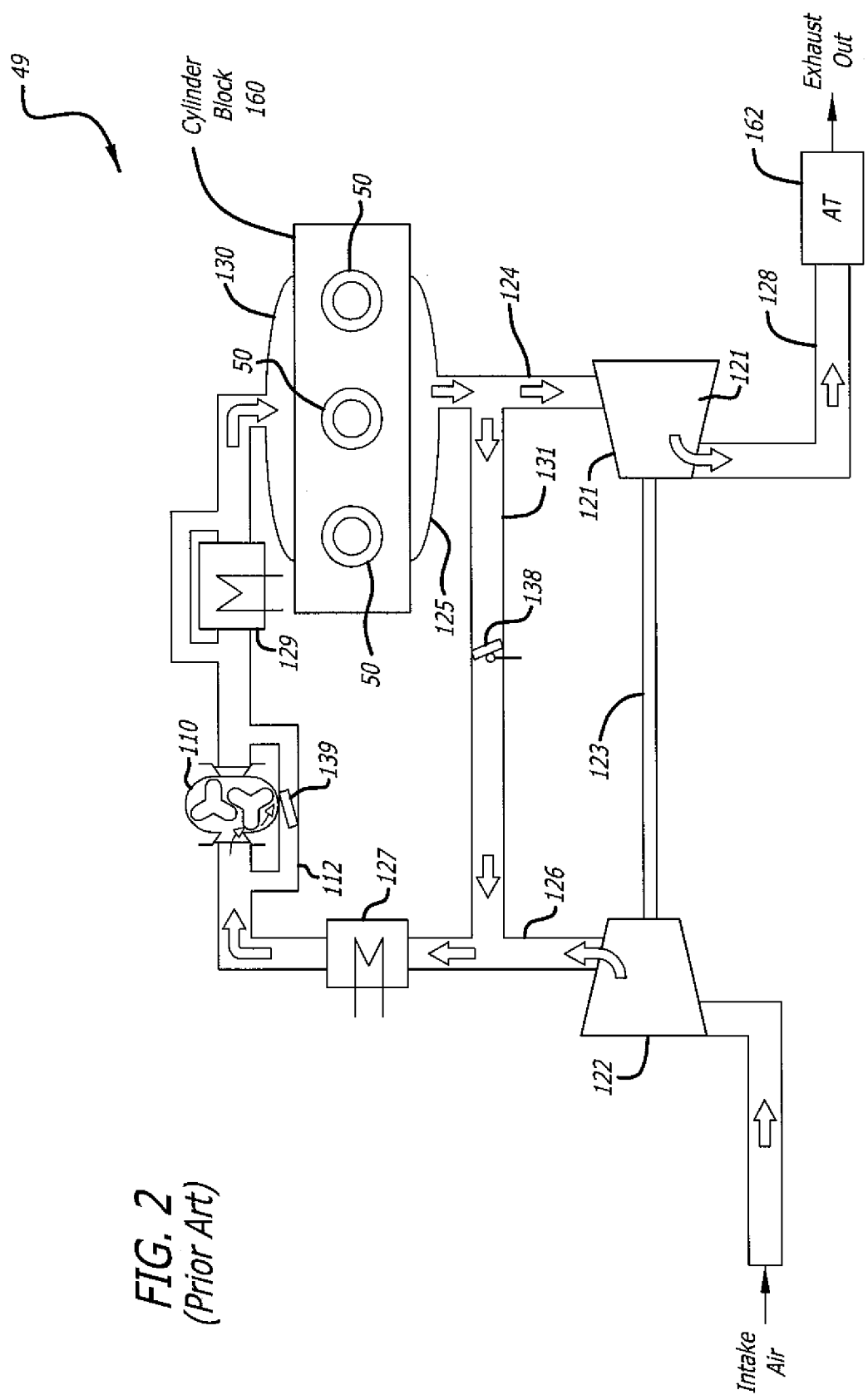
FIG. 2 is a schematic diagram showing details of a prior art air handling system for the opposed-piston engine of FIG. 1, and is appropriately labeled "Prior Art".
Figure 3A:
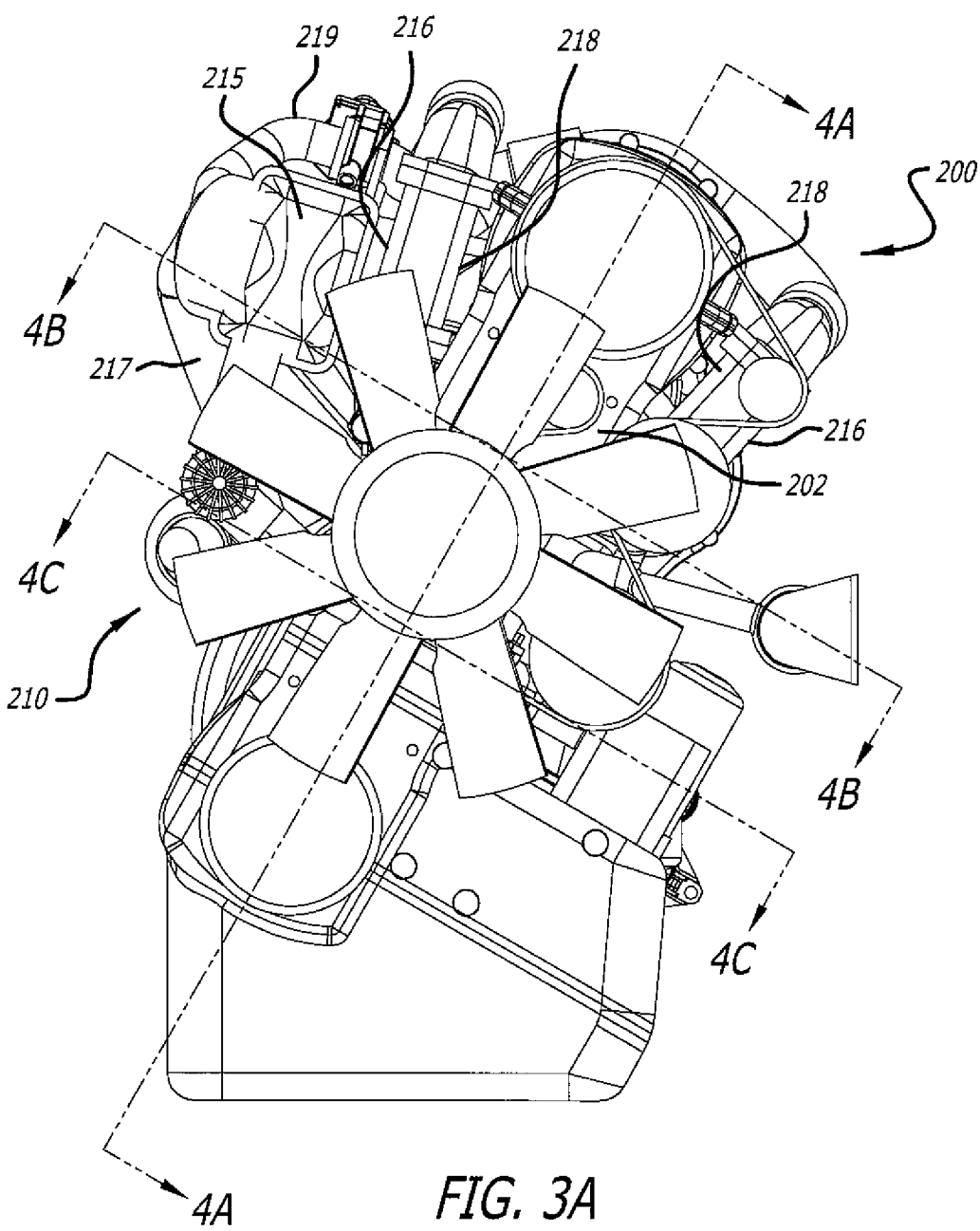
FIG. 3A is a front elevation view of a two-stroke cycle, opposed-piston engine configured for fitment in a vehicle.
Figure 3C:
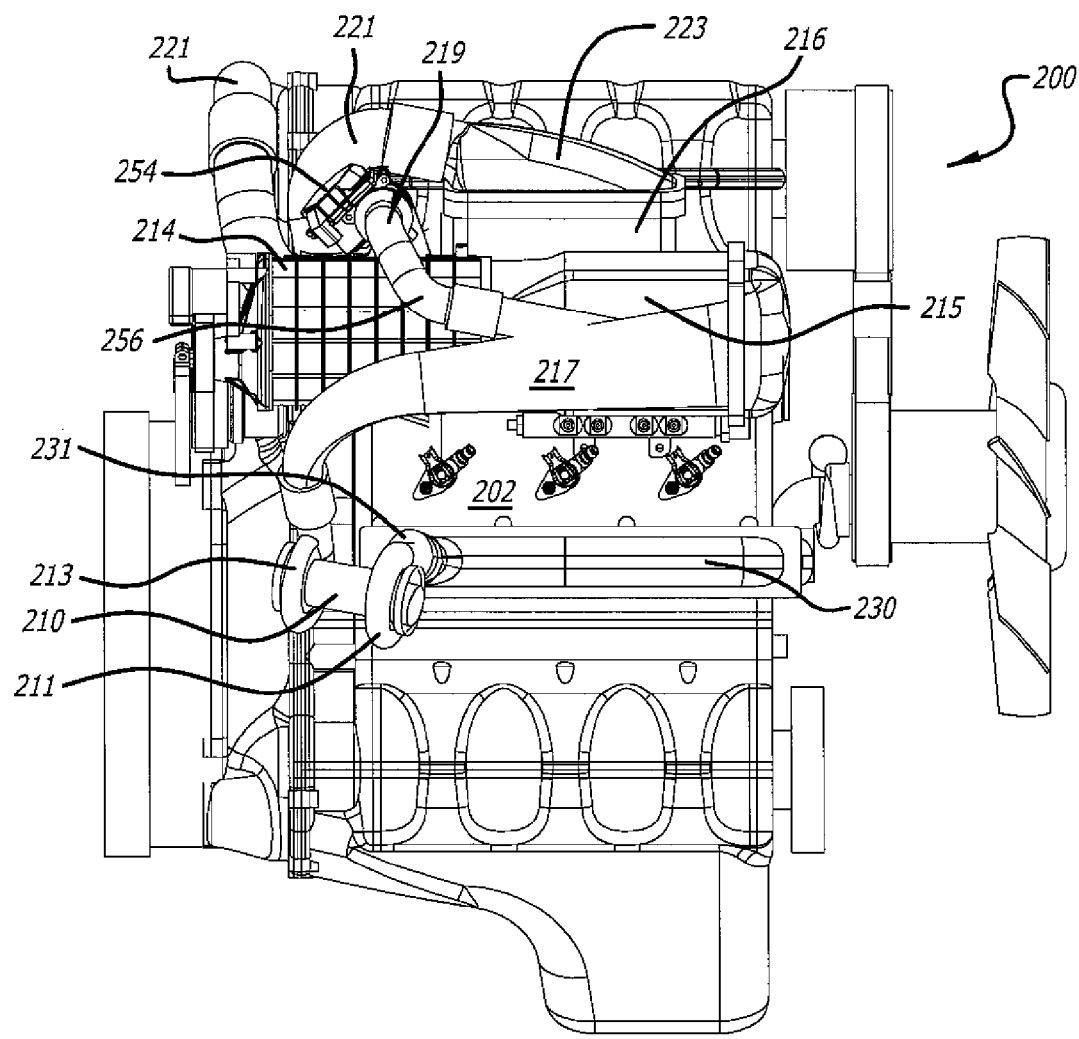
FIG. 3C is a side elevation view of the engine of FIG. 3A.

FIGS. 3A, 3B, and 3C show a two-stroke-cycle, opposed-piston engine 200 having a cylinder block 202 comprising the cylinders (unseen in these figures) of the engine, which are arranged in a slanted inline configuration oriented in a longitudinal direction L of the engine 200. The engine is configured to be compact so as to occupy minimal space in applications such as vehicles, locomotives, maritime vessels, stationary power sources, and so on. The engine 200 is fitted with an air handling system including a turbocharger 210, a supercharger, 214, charge air coolers 215 and 216, intake and exhaust chambers (unseen in these figures) formed or machined in the cylinder block 202, and various pipes, manifolds, and conduits. With the exception of the intake and exhaust chambers, these elements may be supported on the cylinder block using conventional means. The intake and exhaust chambers are formed as elongate, open galleries or chests inside the cylinder block. Preferably, the intake and exhaust chambers are undivided, at least in the sense that they are not partitioned into individual chambers or sub-chambers, each containing the intake (or exhaust) area of only a single cylinder. The turbocharger 210 comprises an exhaust-driven turbine 211 and a compressor 213. Preferably, but not necessarily, the supercharger 214 is mechanically driven, for example by a crankshaft. The outlet of the compressor 213 is in fluid communication with the inlet of the supercharger 214 via the conduit 217 and the charge air cooler 215. The outlet of the supercharger 214 is in fluid communication with each of the charge air coolers 216 via a manifold 220, each branch 221 of which is coupled to a respective charge air cooler 216 by a cover 223. An outlet opening of the exhaust chamber is closed by a cover 230. A pipe 231 through the cover 230 provides fluid communication between the exhaust chamber and the inlet of the turbine 211. Although not shown in these figures, the engine 200 may be equipped with a valve-controlled conduit between the exhaust chamber and the supercharger for EGR.

Figure 3D:
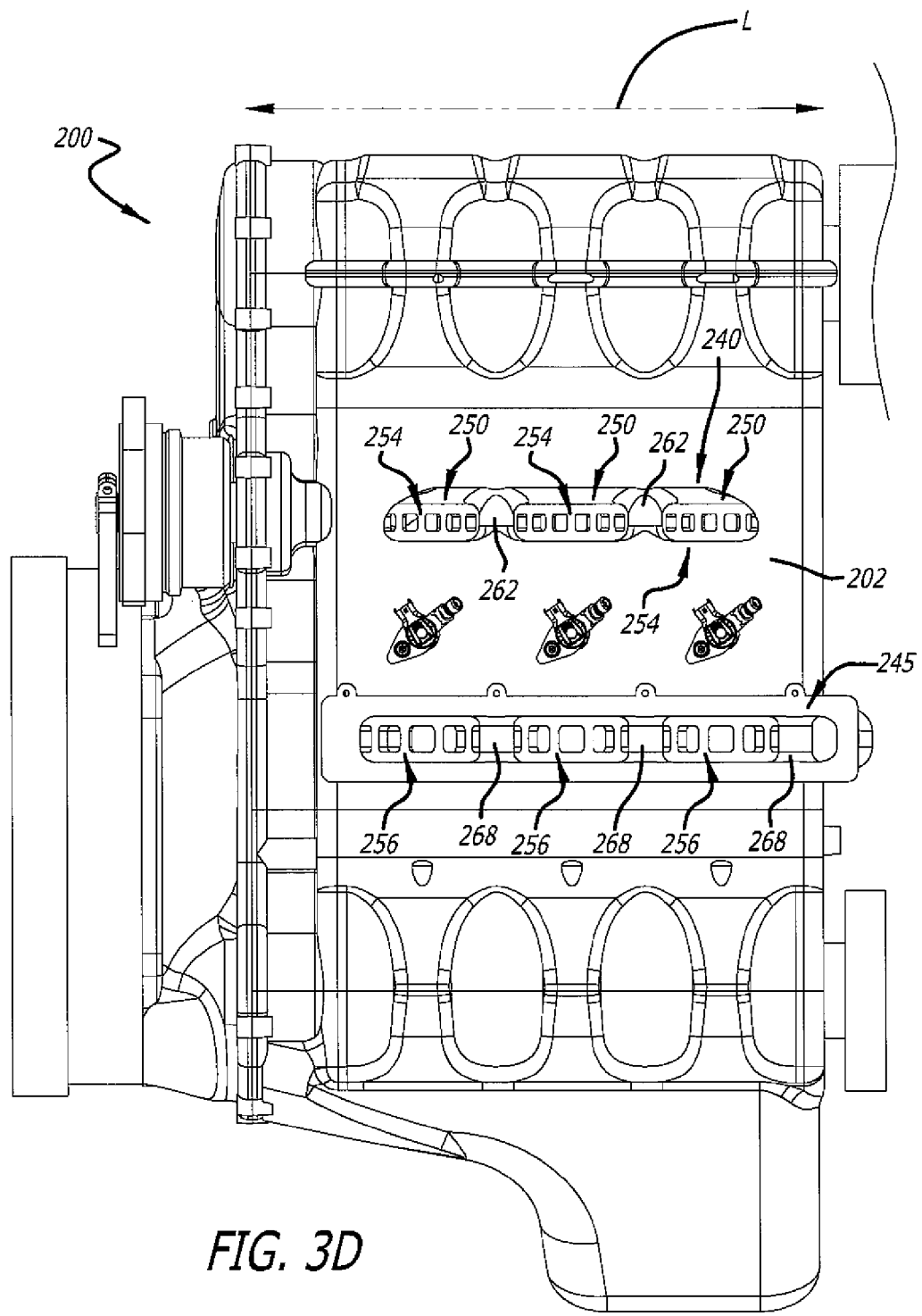
FIG. 3D is an enlargement of the view of FIG. 3C, with components removed from the engine to better illustrate the locations and openings of intake and exhaust chambers inside the cylinder block of the engine of FIG. 3A.

FIG. 3D shows one side of the engine 200, in elevation, with a number of components removed to make visible an intake chamber 240 and an exhaust chamber 245. Both the intake chamber 240 and the and the exhaust chamber 245 open through the side of the cylinder block 202 that is visible in the figure, and also through the opposite side of the cylinder block.

Figure 4A:
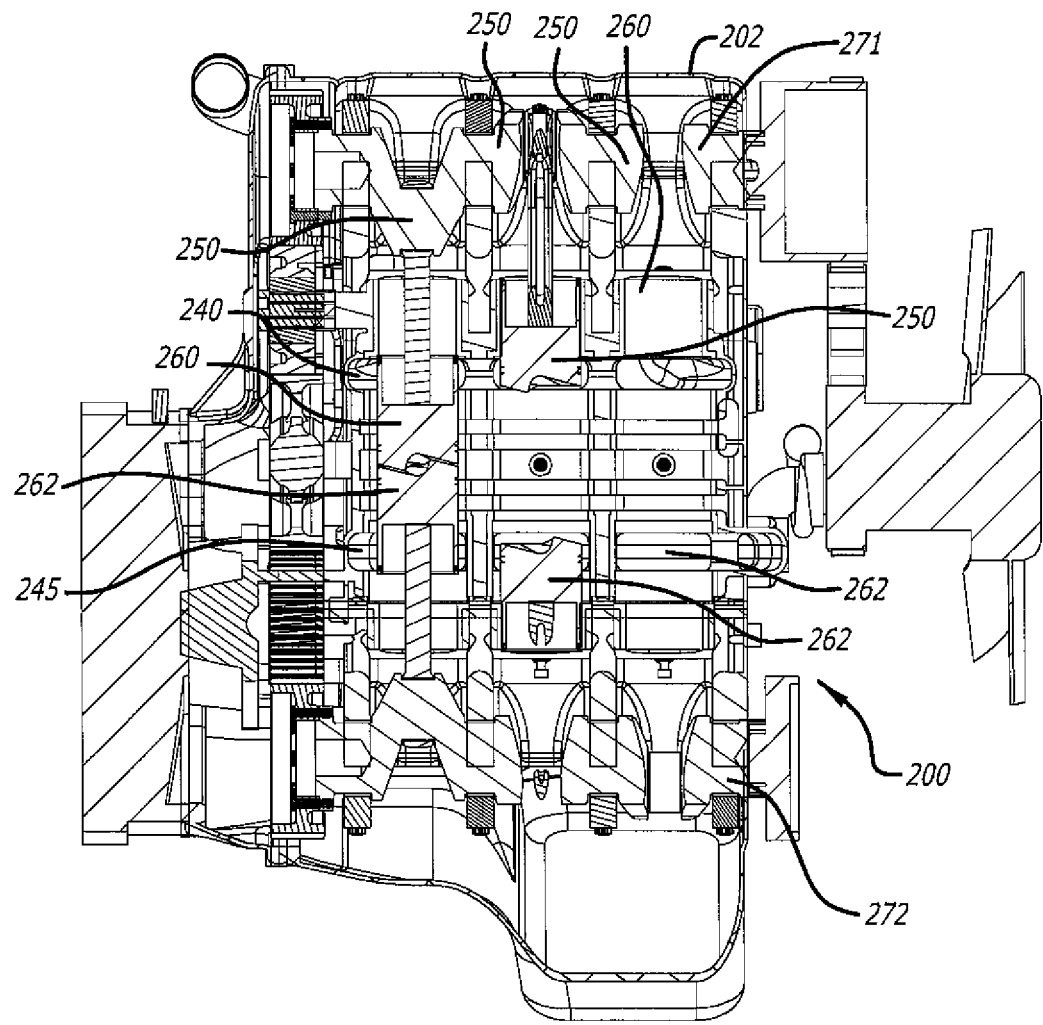
FIG. 4A is a side section of the engine of FIG. 3A, taken along lines A-A.

FIGS. 3D and 4A show a construction of the cylinder block 202 with provision for multiple cylinders. For illustration, three cylinders 250 are shown. In this specification, a "cylinder" is constituted of a liner (sometimes called a "sleeve") retained in a cylinder tunnel formed in the cylinder block 202. Each liner has an annular intake portion including a cylinder intake port 254 separated along the longitudinal axis of the cylinder from an annular exhaust portion including a cylinder exhaust port 256. The cylinders 250 are arranged inline in the cylinder block 202, with the intake ports 254 and exhaust ports 256 disposed at separate levels of the engine 200. Preferably, the exhaust ports 256 are disposed at a level below that of the intake ports 254. Two counter-moving pistons 260, 262 are disposed in the bore of each liner. The pistons 260 control the intake ports of the engine; the pistons 262 control the exhaust ports. A first crankshaft 271 supported on a top portion of the cylinder block 202, is disposed in parallel alignment with the elongate dimension L. All of the pistons 260 are coupled to the first crankshaft 271. A second crankshaft 272 supported on a bottom portion of the cylinder block 202, is disposed in parallel alignment with the elongate dimension L. All of the pistons 262 are coupled to the second crankshaft 272.

Figure 4B:
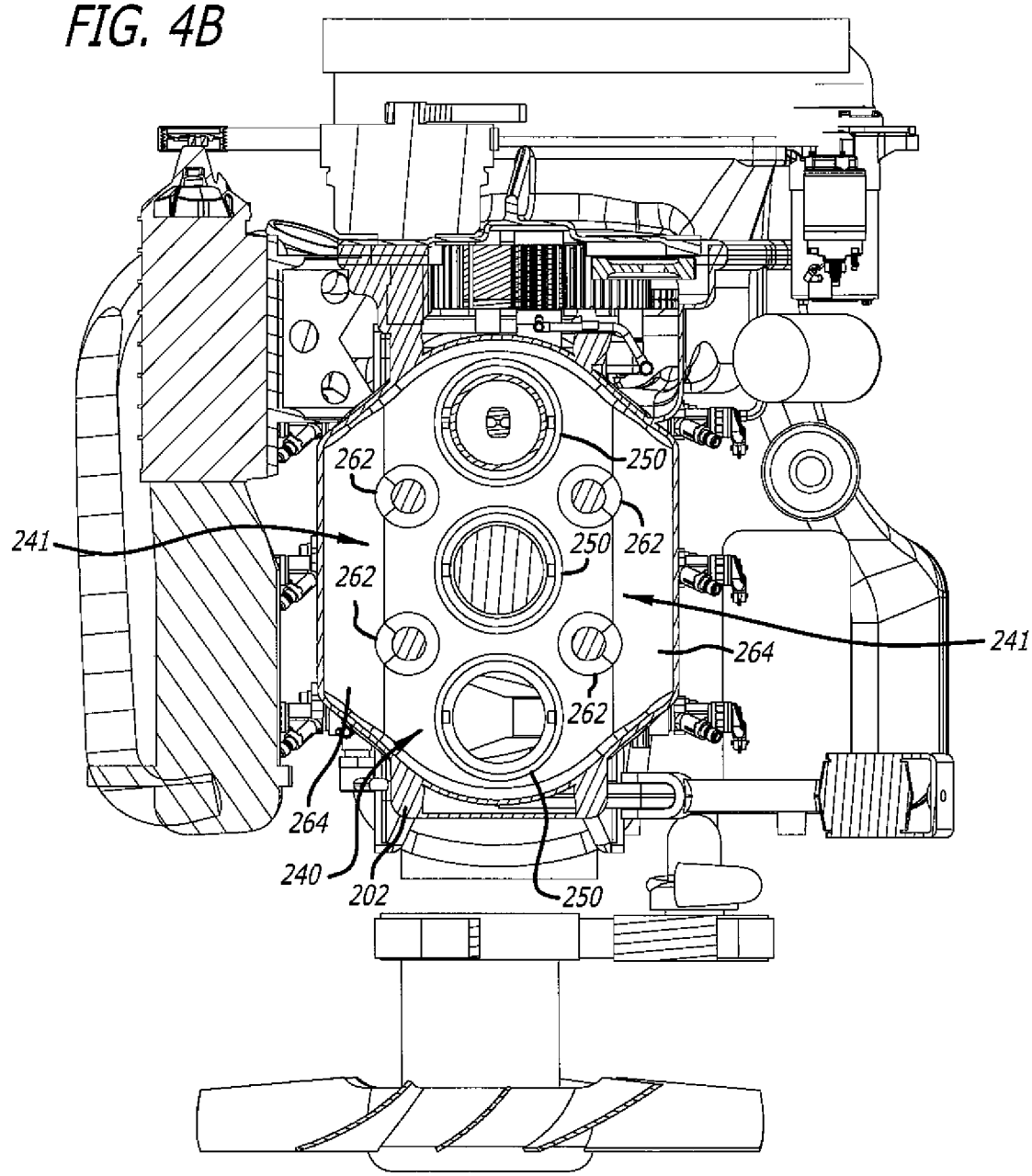
FIG. 4B is sectional view of the engine of FIG. 3A, taken along lines B-B.

With reference to FIGS. 3D and 4B, the structure of the intake chamber 240 is that of an elongated, open chest inside the cylinder block 202 with an undivided volume that contains all of the cylinder intake ports 254. In other words, each and every one of the intake ports of the engine is positioned in, and receives charge air from, the same volume in the intake chamber 240 that is shared by all of the intake ports. As per FIG. 4B, the intake chamber 240 includes a first elongated air inlet 241 that opens through a first side of the cylinder block 202 and a second elongated air inlet 241 that opens through a second side of the cylinder block 202 that is opposite the first side. Thus there are elongated air inlets 241 mutually aligned, and disposed in opposite sides of the chamber 240. Preferably, the elongations of the intake chamber 240 and the air inlets 241 are in the longitudinal direction L. As seen in FIGS. 3D and 4B, support posts 262 in the intake chamber 240 provide structural support between the floor and ceiling of the intake chamber 240. Preferably, the posts 262 are positioned adjacent to, or inwardly of, the air inlets 241, away from the cylinders 250.

Figure 6:
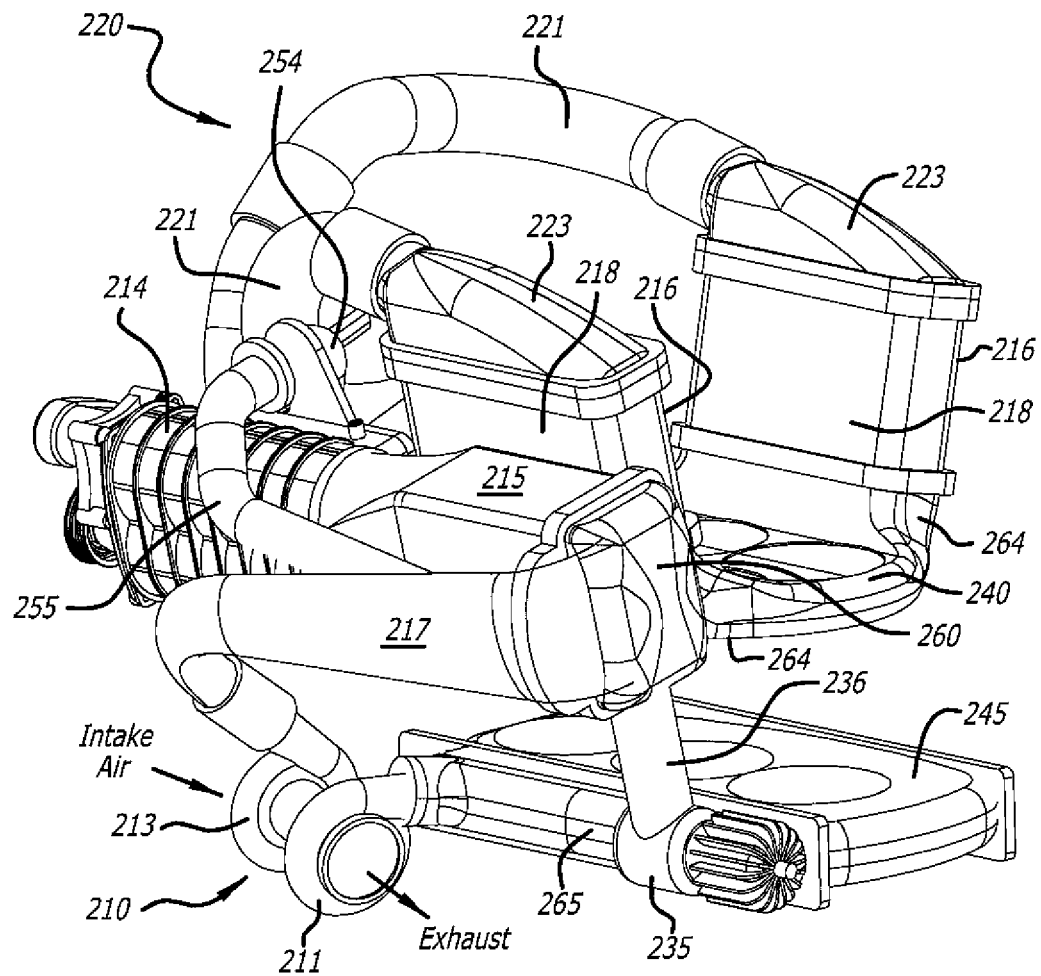
FIG. 6 is an illustration of an intake/exhaust subsystem for an opposed-piston engine according to the specification.

As seen in FIGS. 3B and 6, the charge air coolers 216 are positioned adjacent to the opposing sides of the cylinder block 202. As per FIGS. 4B and 6 each charge air cooler 216 is short-coupled to a respective one of the intake chamber air inlets 241 by a flange adapter 264 having a first end that is aligned and coextensive with the outlet face of the cooler 216 and a second end that is aligned and coextensive with the air inlet. The flange adapters 264 may be formed integrally with the cylinder block 202, or may comprise separate pieces that are attached to it. Preferably, the flange adapters are shaped so as to guide the airflow into the intake chamber 240 with minimal disruption. For example, the flange adapters may be curved. In some aspects, the charge air coolers 216 have generally boxlike constructions with opposing major surfaces 218.

As per FIGS. 3A and 6, the charge air coolers are preferably disposed in a folded configuration with respect to the cylinder block 202, in which each cooler 216 is positioned adjacent a respective side of the block with a major surface 218 facing the side. Viewed from another aspect, the charge air coolers 216 are disposed in a saddlebag-like configuration with respect to the cylinder block 202 where the charge air coolers 216 are situated in alignment on respective opposing sides of the cylinder block 202. From either point of view, the disposition of the coolers with major surfaces 218 facing opposite sides of the cylinder block 202 contributes significantly to the compact profile of the engine 200. In some instances, the charge air coolers 216 may be gas-to-liquid heat exchangers constructed to transfer heat from charge air (possibly including exhaust gasses) to a liquid.

Figure 4C:
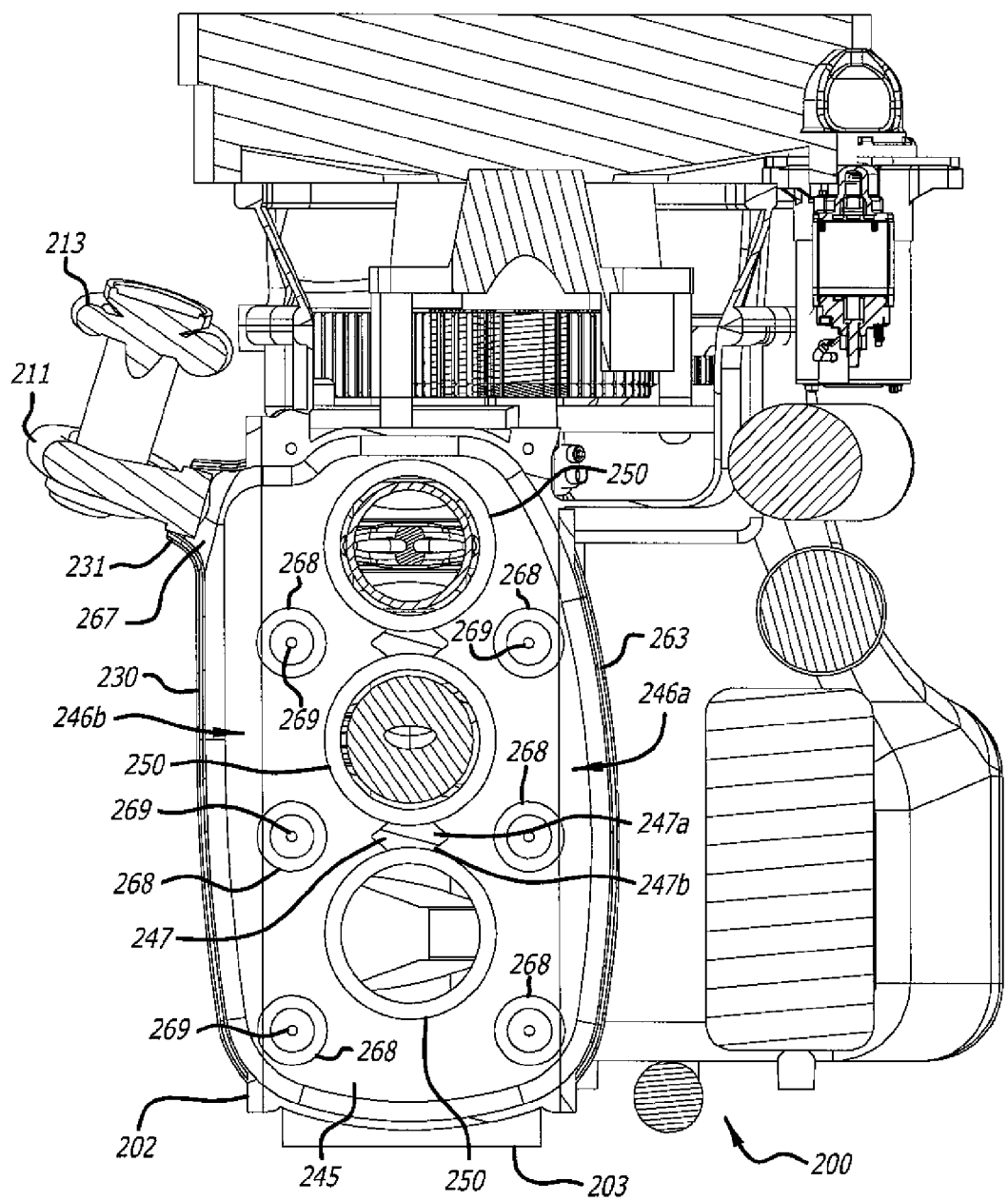
FIG. 4C is sectional view of the engine of FIG. 3A, taken along lines C-C

With respect to FIGS. 3D and 4C, the structure of the exhaust chamber 245 is that of an elongate open chest inside the cylinder block with an undivided volume that contains all of the cylinder exhaust ports 256. In other words, each and every one of the exhaust ports of the engine is positioned in, and discharges exhaust gasses into, the same volume in the exhaust chamber 245 that is shared by all of the exhaust ports. As per FIG. 4C, the exhaust chamber has an elongate exhaust outlet 246a that opens through the first side of the cylinder block 202 and a second elongate exhaust outlet 246b that opens through the second side of the cylinder block 202. Thus there are elongate exhaust chamber exhaust outlets 246a and 246b on opposite sides of the exhaust chamber 245. As seen in FIGS. 3D and 4C, support posts 268 in the exhaust chamber 245 provide structural support between the floor and ceiling of the exhaust chamber 245. Preferably, the posts 268 are positioned near the exhaust outlets 246a and 246b, away from the exhaust ports. In view of the mechanical loads borne by the cylinder block 202 during operation of the engine, it may be desirable to have the posts 262 of the intake chamber in alignment with the posts 268 of the exhaust chamber. In some aspects it may be desirable to provide axial coolant passageways 269 in the posts 268 in order to mitigate detrimental temperature effects in the structure of the exhaust chamber 245 during engine operation. The exhaust outlet 246a is closed by the elongate cover 263 that curves outwardly from the cylinder block 202. The elongate cover 230 extends over the exhaust outlet 246b. The covers 263 and 230 may be formed integrally with the cylinder block 202, or may comprise separate pieces that are attached to the block. The inlet of the turbine 211 is in fluid communication with the exhaust chamber 245 via an opening 267 through the cover 230 that receives the pipe 231. Preferably, the elongations of the exhaust chamber 245 and the exhaust outlets 246a and 246b are in the longitudinal direction L.

While the open chest structure of the exhaust chamber 245 may permit close inter-cylinder spacing, the reduced distance between adjacent cylinder sleeves can increase the thermal impact of exhaust gas being discharged from one cylinder on the pistons and sleeves of adjacent cylinders, especially in the narrow gaps between the exhaust portions of the sleeves. Thus, in some instances, it may be desirable to reduce the thermal impact of exhaust gasses being discharged from a cylinder on the adjacent cylinder skirts. One way to reduce this thermal impact is to provide shaped exhaust deflectors 247 in the exhaust chamber 245, between adjacent cylinder exhaust portions. Each deflector may be formed as a post that extends between the floor and ceiling of the exhaust chamber 245. The exhaust deflectors 247 are positioned between adjacent cylinders 250, in the vicinity of the cylinders' exhaust areas. The shapes of the exhaust deflectors 247 include pairs of surfaces 247a and 247b that meet at an angle to form an edge facing one of the exhaust chamber openings. For example, the cross-sectional shape of an exhaust deflector may be rhombus-like. The surfaces 247a and 247b are angled to deflect exhaust gas being discharged from one exhaust port away from the adjacent cylinder. Although FIG. 5B suggests that the exhaust deflectors 247 are in contact with adjacent cylinders, this is not a necessary limitation. In some aspects, the deflectors may be of a size so as not to contact the cylinders, thereby permitting gas flow between cylinders and the deflectors. Alternatively n (or in addition), the exhaust port openings may vary in size and/or spacing around the annular exhaust portions of the cylinder liners so as to provide relatively greater exhaust flows in the directions of the exhaust chamber openings than in the directions of nearby structures such as adjacent liners and/or exhaust chamber walls.

It is desirable to maximize the fluid communication from one side of the exhaust chamber to the other in order to maintain as uniform a pressure as is possible across the exhaust chamber 245. Maintaining pressure balance within the exhaust chamber during blow down (the time during which an exhaust port is open) enhances the scavenging performance of the engine. In these aspects, the exhaust chamber 245 may include additional space at either or both ends in order to increase the flow space from one side of the engine to the other. See, for example the additional space in the exhaust chamber 245 near the end 203 of the cylinder block 202. Contoured space may also be added by design of either or both of the covers 230 and 263. Pressure imbalance from one side of the exhaust chamber to the other is detrimental to mass flow through the cylinders because it biases the scavenging front to one side instead of being more symmetric. In some of these cases, the size of the exhaust chamber 245 may exceed that of the intake chamber 240. If necessary for structural integrity of the engine, one or more additional pairs of support posts 268 may be provided in the exhaust chamber 245.

The air handling system of the opposed-piston engine 200 may also include either or both of an EGR channel and a recirculation channel for the supercharger 214. Thus, in some aspects, it may be desirable to equip the engine 200 for exhaust gas recirculation. In this regard, with reference to FIGS. 5A and 5B, the exhaust chamber 245 is in fluid communication with an EGR channel having an inlet comprising a pipe 232 that opens through the cover 230 into the exhaust chamber 245. The EGR channel comprises an EGR valve 235 and a pipe 236 which transports exhaust gasses from the exhaust chamber 245 for mixing with charge air being provided to the intake chamber. In some further aspects, it may be desirable to cool the exhaust gas during recirculation. In these cases, the pipe 236 delivers recirculated exhaust gas through a manifold cover 260 to the inlet of the air charge cooler 215.

Figure 5A:
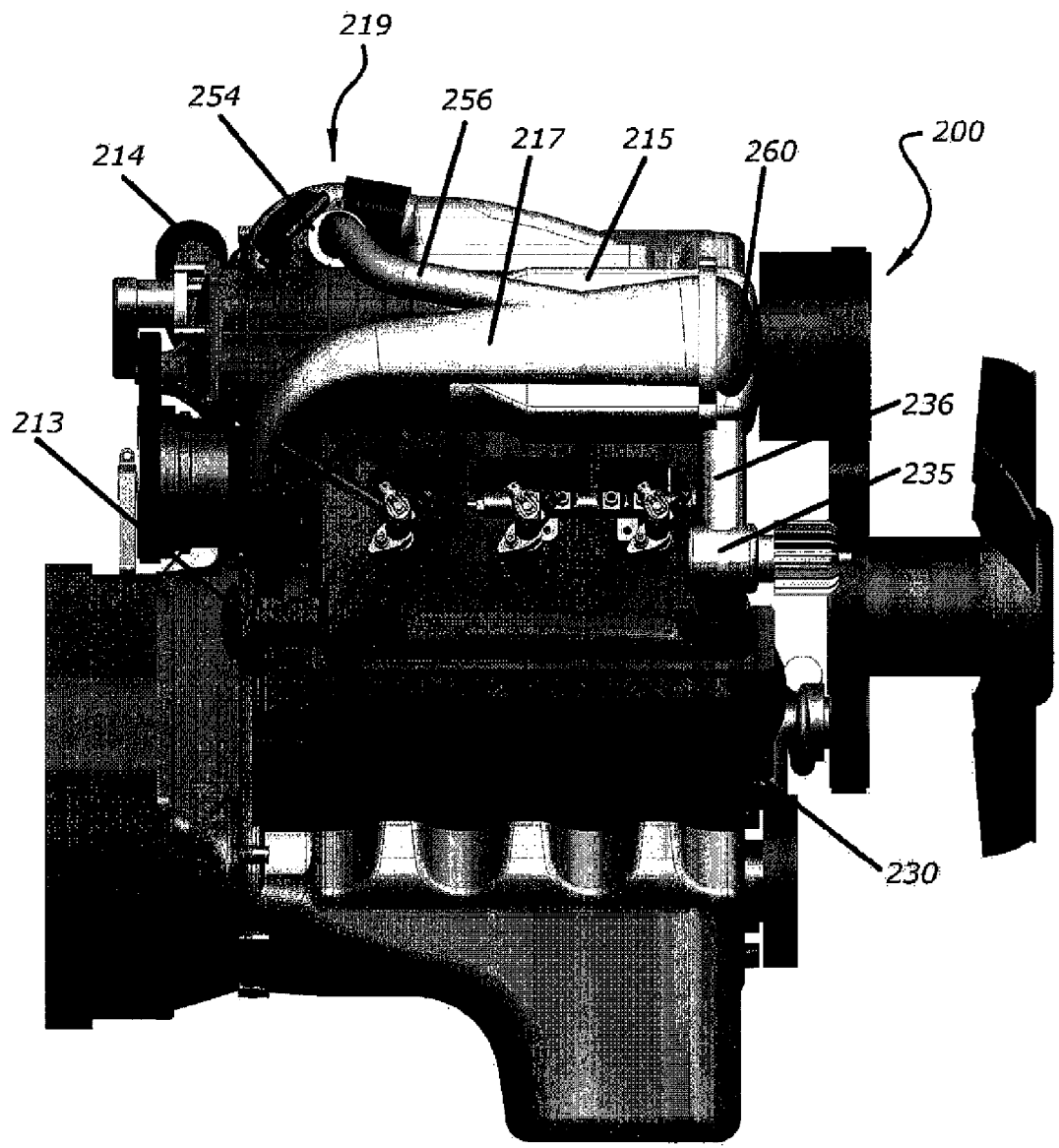
FIGS. 5A and 5B show the engine of FIG. 3A equipped with EGR.
Figure 5B:
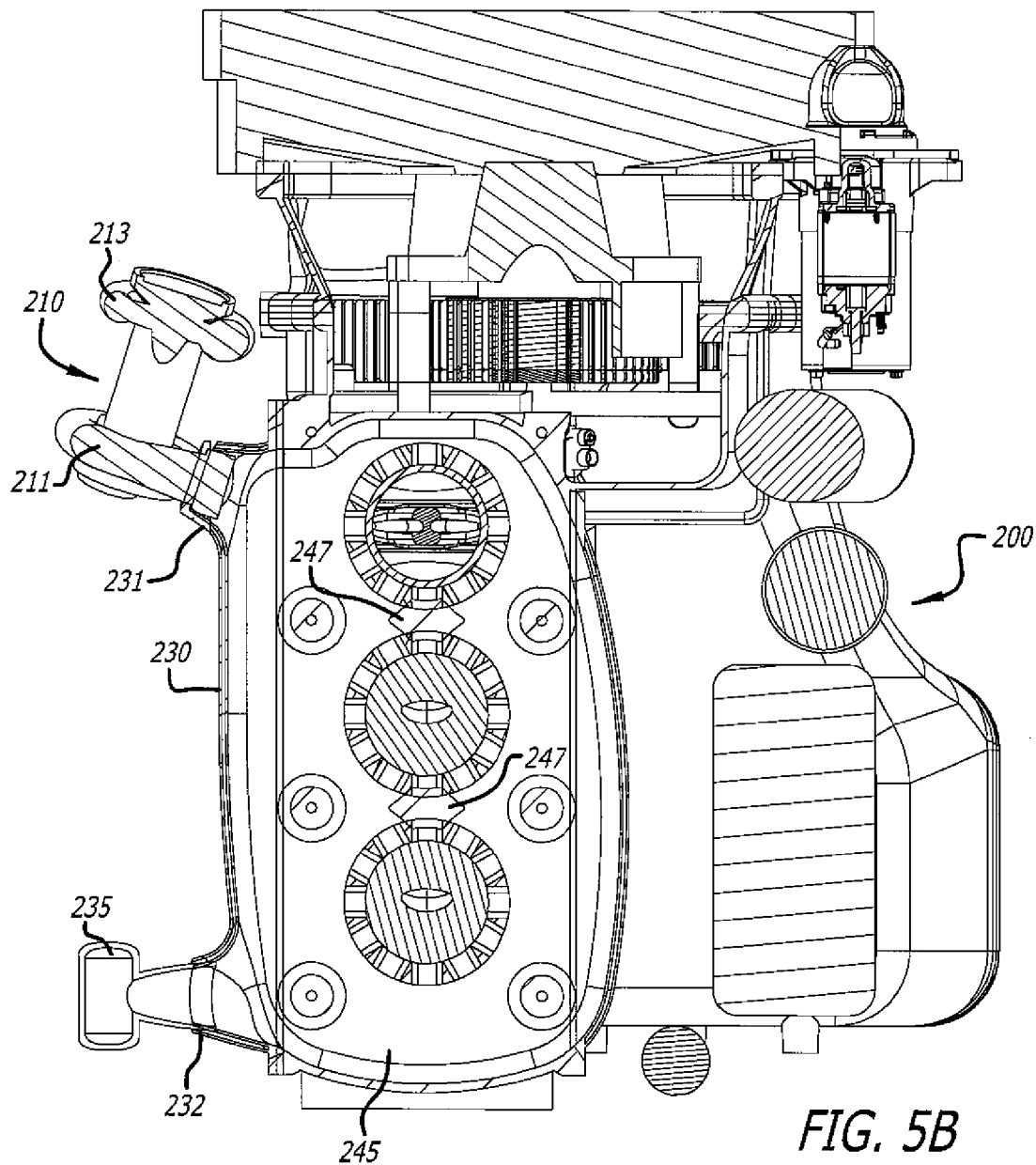

As seen in FIGS. 5A and 6, a recirculation channel 219, comprising a recirculation valve 254 and a pipe 256, couples the outlet of the supercharger 214 with its inlet. Under control of the valve 254, the recirculation channel adjusts boost pressure provided by the supercharger 214 as required by engine operating conditions. Preferably the recirculated charge air is cooled before being once again input to the supercharger 214. Thus as best seen in FIGS. 3B, 3C, and 6, a portion of the pressurized charge air output by the supercharger 214 may be recirculated to its inlet through the recirculation channel 219 under control of the recirculation valve 254, which has an inlet coupled in common with the two branches 221, via the manifold 220. The outlet of the recirculation valve 254 is coupled by the recirculation pipe 256 to the inlet of the cooler 215 via the conduit 217.

The EGR and supercharger recirculation options integrate well with the folded (or saddleback) arrangement of the coolers 216 because of the availability of the charge air cooler 215. Provision of the charge air cooler 215 means that neither recirculated exhaust nor recirculated charge air need be channeled to the coolers 216 independently of the supercharger 214. Consequently, the short coupling connections between the coolers 216 and the intake chamber 240 are uninterrupted, the opposing uniform mass flows from the coolers 216 into the intake chamber are maintained, and the compact engine profile is preserved.

Figure 7:
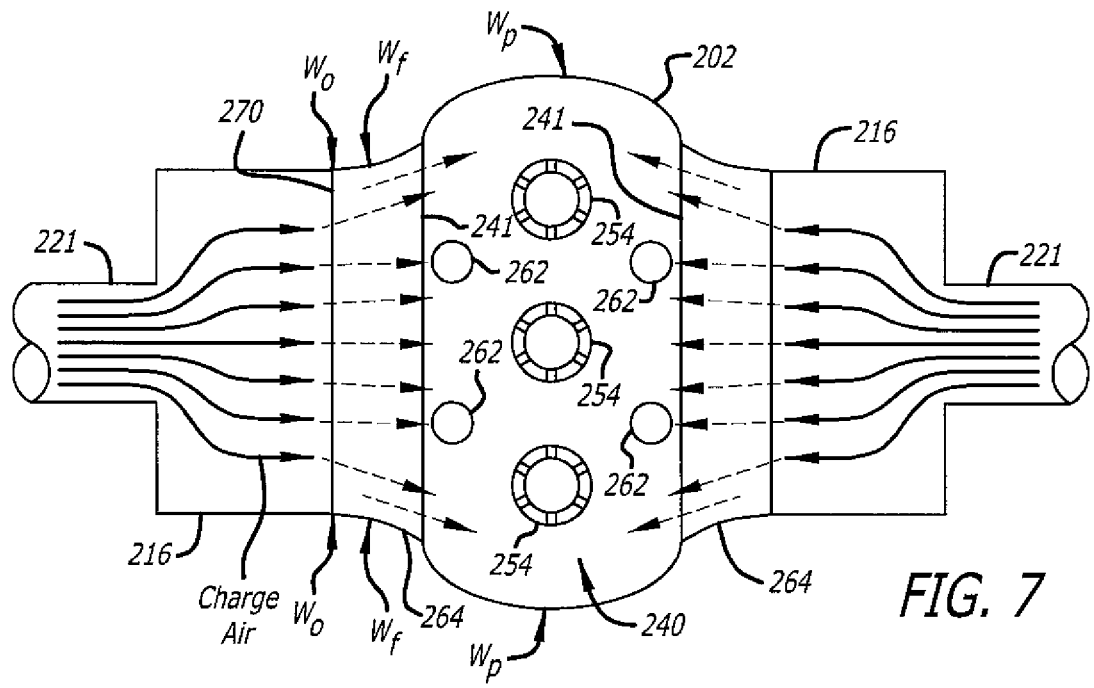
FIG. 7 is a schematic illustration of charge air flow into an intake chamber according to the specification.

With reference to FIGS. 5A and 6, during engine operation, pressurized intake air provided by the compressor 213 is cooled in the charge air cooler 215 and fed to the inlet of the supercharger 214. The charge air is further pressurized by the supercharger 214 and divided between the charge air coolers 216 by the manifold 220. The EGR valve 235 governs the flow of recirculated exhaust gasses, which are mixed with charge air in the manifold cover 260, and cooled in the cooler 215. The cooled mixture of recirculated exhaust gas and charge air is provided to the inlet of the supercharger 214. Referring to FIGS. 6 and 7, the manifold 220 divides the charge air flow roughly evenly between the manifold branches 221 so that the charge air coolers 216 receive, and deliver, substantially equal mass air flows to the air inlets 241 of the intake chamber. that integrates well with the "saddle bag" configuration of the charge air coolers 216.

Figure 8:
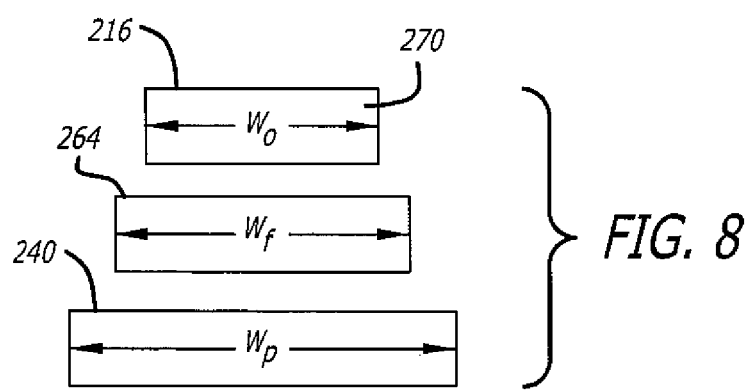
FIG. 8 is a schematic representation of the airflow path into the intake chamber of FIG. 7.

With reference to FIGS. 7 and 8, the shape and construction of each charge air cooler 216 spreads the charge air flow, reducing the velocity and dampening spikes and surges of the airflow. From the coolers, oppositely-directed air flows enter the intake chamber 240. Preferably, the core of each charge air cooler 216 is sized such that the width $W_O$ of cooler's outlet face 270 is no greater than the width $W_P$ of the intake chamber 240; preferably that constraint is maintained in the air flow path from the outlet face 270, through the flange adaptor 264, to the intake chamber 240. In some cases, depending on the required cooling capacity and the engine space available for the charge air coolers 216, the width $W_O$ of the outlet face 270 may be less than the width $W_P$ of the intake chamber 240 and also less than the width $W_F$ of the flange 264. In these cases, it is desirable that the width of the air flow path from the outlet face 270, through the flange adaptor 264, to the intake chamber 240 increase continuously, or in one or more steps, so as to avoid kinks and constrictions in the air flow path; in other words $W_O \leq W_F \leq W_P$.

As per FIGS. 7 and 8, the large outlet face 270 of the charge air cooler 216 results in reduced air velocities of charge air flowing into the intake chamber 240. At every point along the cooler outlet face, the air has roughly the same flow vector. Asymmetries and oscillations introduced into the flow of charge air by bends and shape variations in the air flow path upstream of the charge air coolers 216 are largely dampened out, if not removed, by the passage of charge air through the coolers. Computer modeling indicates that the charge air portion of the air handling system shown in FIG. 6 reduces cylinder-to-cylinder variation in the mass flow rates into the intake ports. Another benefit indicated by modeling is that the mass flow rates into the cylinders are largely independent of engine speed. These effects are reinforced by positioning the structural posts 262 away from the cylinders to the outside of the intake chamber, which helps all ports to breath equally.

Still another benefit of the charge air portion layout is that packaging restrictions arising from engine space and configuration requirements are well-balanced with any need to tune for the interactions of opposing air flows into the in the intake chamber 240. Such balance would be more difficult to achieve without the wave-dampening effect provided by the coolers 216. Moreover, splitting the cooling function between two coolers allows for packaging more cooler volume than could be efficiently packaged using a single large cooler and separate manifolds coupling the cooler to the intake chamber.

With the exhaust portion of the air handling system shown in FIG. 6, the open space in the exhaust chamber 245 provides low resistance for exhaust gas flow, which increases the delivery ratio in all cylinders. The shaped deflector posts 247 (FIGS. 4C and 5B) reduce thermal impact on the adjacent cylinder skirts. Compared with an exhaust system for a traditional opposed-piston engine (such as in a Jumo 205) with exhaust runners and multi-pipe manifolds on each side of the engine, the exhaust portion construction described and illustrated in this specification has less surface area, which helps to reduce heat transfer, and also has less gas volume, which improves the transient response of the engine. Computer modeling of the exhaust portion of the air handling system shown in FIG. 6 also indicates that the short coupling between the turbocharger 210 and the open exhaust chamber 245 reduces exhaust wave resonance, thereby contributing to the smooth and constant mass flow rates at the intake ports. A smooth and constant mass flow in the charge air portion contributes substantially to a uniform scavenging front that pushes out residual exhaust products from the cylinder without losing fresh charge air.

Thus, the new arrangement of intake and exhaust chambers results in a lighter, more compact opposed-piston engine and improves mass flow through the cylinders. The desirable effects of cooled charge air are realized by equipping the new chamber arrangement with a small, compact charge air cooler architecture that both cools and smooths the flow of charge air upon delivery to the engine's intake ports. Various changes may be made in the details disclosed in this specification without departing from the invention or sacrificing the advantages thereof.

The invention claimed is:

1. An opposed-piston engine, comprising:
a cylinder block with first and second opposing sides and a plurality of cylinders disposed in an inline array between the opposing sides, in which each cylinder includes an intake port separated in an axial direction of the cylinder from an exhaust port,
an undivided intake chamber inside the cylinder block;
a first air inlet that opens through the first side into the intake chamber and a second air inlet that opens through the second side into the intake chamber;
each air inlet having an elongate dimension;
all of the cylinder intake ports being contained in the intake chamber to receive charge air therein; and,
an exhaust chamber in the cylinder block including at least one exhaust outlet that opens through one of the opposing sides;
all of the cylinder exhaust ports being contained in the exhaust chamber to discharge exhaust thereinto.

2. The opposed-piston engine of claim 1, further including a respective charge air cooler adjacent each of the opposing sides of the cylinder block, each charge air cooler having an elongate outlet opening in fluid communication and aligned with an elongate dimension of an air inlet.

3. The opposed-piston engine of claim 2, further including an air flow manifold coupling the charge air coolers to a supercharger.

4. The opposed-piston engine of claim 3, in which the at least one exhaust outlet is in fluid communication with a turbine inlet.

5. The opposed-piston engine of claim 3, in which the at least one exhaust outlet is in fluid communication with a turbine inlet and an EGR inlet.

6. The opposed-piston engine of claim 1, in which the at least one exhaust outlet is in fluid communication with a turbine inlet.

7. The opposed-piston engine of claim 1, in which the at least one exhaust outlet is in fluid communication with a turbine inlet and an EGR inlet.

8. The opposed-piston engine of claim 1, in which the cylinders disposed in one of a straight inline array and a slant inline array.

9. The opposed-piston engine of claim 8, in which the opposed-piston engine further includes first and second crankshafts supported on the cylinder block.

10. An air handling method for an opposed-piston engine according to claim 1, comprising:
feeding compressed air into charge air coolers situated on opposing sides of the cylinder block;
feeding opposing streams of cooled compressed air from the charge air coolers into an intake chamber space inside the cylinder block;
all intake ports receiving the compressed air in the intake chamber space; and,
all cylinder exhaust ports discharging exhaust in an exhaust chamber space inside the cylinder block.

11. An air handling method for an opposed-piston engine according to claim 1, comprising:
feeding opposing streams of cooled compressed air into an undivided intake chamber in the cylinder block;
all intake ports receiving the compressed air in the undivided intake chamber;
and, all exhaust ports discharging exhaust in an undivided exhaust chamber in the cylinder block.

12. An air handling system for an opposed-piston engine having a cylinder block with a plurality of cylinders aligned in a row, in which each cylinder includes an intake port longitudinally separated from an exhaust port, comprising:
an intake chamber in the cylinder block with the cylinder intake ports contained therein;
the intake chamber including first and second elongate air inlets that open through first and second opposing sides, respectively, of the cylinder block;
a first charge air cooler positioned adjacent the first side of the cylinder block;
a second charge air cooler positioned adjacent the second side of the cylinder block;
the first charge air cooler having an elongate outlet coupled to the first elongate air inlet; and,
the second charge air cooler having an elongate outlet coupled to the second elongate air inlet.

13. An air handling system according to claim 12, in which each outlet opening has a width that is no greater than a width of the intake chamber.

14. An air handling system according to claim 12, in which each outlet opening has a width that is no greater than a width of the air inlet to which it is coupled.

15. An air handling system according to claim 14, in which each air inlet has a width that is no greater than a width of the intake chamber.

16. An air handling system according to claim 12, in which the charge air coolers are disposed in a folded configuration with respect to the cylinder block.

17. An air handling system according to claim 16, in which each charge air cooler is coupled to an air inlet by an adapter having a first end that is aligned and coextensive with the outlet opening of the charge air cooler and a second end that is aligned and coextensive with the air inlet.

18. An air handling system according to claim 16, further including a supercharger in fluid communication with the charge air coolers.

19. An air handling system according to claim 12, in which each charge air cooler has a major surface facing the side to which it is adjacent.

20. An air handling system according to claim 12, further including an exhaust chamber in the cylinder block with the cylinder exhaust ports contained therein, in which the exhaust chamber includes one or more exhaust openings through the sides of the cylinder block.

21. An air handling system according to claim 20, in which the exhaust chamber is in fluid communication with a turbine inlet and with an EGR channel.

22. An opposed-piston engine including a cylinder block with first and second opposing sides and a plurality of cylinders disposed in an inline array between the opposing sides, a first crankshaft mounted to a top portion of the cylinder block in alignment with the inline array, and a second crankshaft mounted to a bottom portion of the cylinder block in alignment with the inline array, in which:
- a first charge air cooler located along the first side of the cylinder block has an outlet in fluid communication with an intake chamber inside the cylinder block that contains intake ports of the cylinders; and,
- a second charge air cooler located along the second side of the cylinder block has an outlet in fluid communication with the intake chamber.

23. The engine according to claim 22, in which each of the first and second charge air coolers has a major flat surface facing the side along which it is located.

24. The engine according to claim 22, further including a supercharger having an inlet and an outlet, and a third charge air cooler having an inlet and an outlet, in which:
- a manifold couples the outlet of the supercharger with inlets of the first and second charge air coolers and with an inlet of a recirculation channel;
- the inlet of the supercharger is in fluid communication with the outlet of the third charge air cooler; and,
- the recirculation channel has an outlet coupled to the inlet of the third charge air cooler.

25. The engine according to claim 24, further including an EGR channel, in which an outlet of the EGR channel is coupled to the inlet of the third charge air cooler and an inlet of the EGR channel is in fluid communication with an exhaust chamber inside the cylinder block containing exhaust ports of the cylinders.

* * * * *